US012358754B2

(12) United States Patent
Viljanen et al.

(10) Patent No.: US 12,358,754 B2
(45) Date of Patent: Jul. 15, 2025

(54) SOLUTION FOR OPERATING AN ELEVATOR HAVING DIFFERENT ELEVATOR CAR MOTION PROFILES

(71) Applicant: Kone Corporation, Helsinki (FI)

(72) Inventors: Mikko Viljanen, Helsinki (FI); Henri Wenlin, Helsinki (FI); Asmo Tenhunen, Helsinki (FI); Antti Kallioniemi, Helsinki (FI); Mikko Parviainen, Helsinki (FI)

(73) Assignee: Kone Corporation, Helsinki (FI)

( * ) Notice: Subject to any disclaimer, the term of this patent is extended or adjusted under 35 U.S.C. 154(b) by 1176 days.

(21) Appl. No.: 16/845,433

(22) Filed: Apr. 10, 2020

(65) Prior Publication Data

US 2020/0339381 A1 Oct. 29, 2020

(30) Foreign Application Priority Data

Apr. 25, 2019 (EP) .................................... 19171052

(51) Int. Cl.
*B66B 1/34* (2006.01)
*B66B 1/28* (2006.01)
(Continued)

(52) U.S. Cl.
CPC ................ *B66B 1/30* (2013.01); *B66B 1/285* (2013.01); *B66B 1/3492* (2013.01); *B66B 1/36* (2013.01);
(Continued)

(58) Field of Classification Search
CPC ......... B66B 1/24; B66B 1/28–30; B66B 1/32; B66B 1/3407; B66B 1/3492; B66B 5/0006; B66B 5/0018; B66B 5/04; B66B 5/06
See application file for complete search history.

(56) References Cited

U.S. PATENT DOCUMENTS 4,898,263 A * 2/1990 Manske ................ B66B 5/0087 187/247
8,863,908 B2 * 10/2014 Villa ....................... B66B 1/302 187/295
(Continued)

FOREIGN PATENT DOCUMENTS

JP H07112876 A 5/1995
JP H1179571 A 3/1999
(Continued)

OTHER PUBLICATIONS

European Search Report for Application No. EP19171052, dated Oct. 24, 2019.

*Primary Examiner* — Christopher Uhlir
(74) *Attorney, Agent, or Firm* — Harness, Dickey & Pierce, P.L.C.

(57) ABSTRACT

The invention relates to a method for operating an elevator system. The method comprises receiving a request to drive an elevator car to a destination and generating an elevator car motion profile to serve the received request. The elevator car motion profile comprises at least the following motion parameters of the elevator car: acceleration, maximum speed, and deceleration. At least one of the maximum speed of the elevator car and the deceleration of the elevator car in the generated elevator car motion profile is defined on the basis of the destination. The invention relates also to a processing unit and an elevator system configured to perform the method at least partly.

13 Claims, 5 Drawing Sheets

(51) Int. Cl.

| | |
|---|---|
| ***B66B 1/30*** | (2006.01) |
| ***B66B 1/36*** | (2006.01) |
| ***B66B 5/00*** | (2006.01) |
| ***B66B 5/06*** | (2006.01) |

(52) U.S. Cl.
CPC .............. *B66B 5/0068* (2013.01); *B66B 5/06* (2013.01); *B66B 2201/102* (2013.01)

(56) References Cited

U.S. PATENT DOCUMENTS

| | | | | |
|---|---|---|---|---|
| 8,985,280 | B2 * | 3/2015 | Kauppinen | B66B 1/30 187/382 |
| 11,267,677 | B2 * | 3/2022 | Ruhnke | B66B 9/00 |
| 2019/0389694 | A1 * | 12/2019 | Herkel | B66B 5/005 |

FOREIGN PATENT DOCUMENTS

| | | | |
|---|---|---|---|
| JP | 2008133126 | A | 6/2008 |
| WO | 2015/078859 | A1 | 6/2015 |

* cited by examiner

SOLUTION FOR OPERATING AN ELEVATOR HAVING DIFFERENT ELEVATOR CAR MOTION PROFILES

RELATED APPLICATIONS

This application claims priority to European Patent Application No. 19171052.4 filed on Apr. 25, 2019, the entire contents of which are incorporated herein by reference.

TECHNICAL FIELD

The invention concerns in general the technical field of elevators. Especially the invention concerns safety of the elevators.

BACKGROUND

An elevator comprises an elevator car, an elevator controller and hoisting machine. The elevator car is driven with the hoisting machine by means of hoisting ropes, which run via a traction sheave of the hoisting machine. An elevator controller generates a motion profile for the elevator car. The elevator car is driven between landings in accordance with the generated motion profile. An example of an elevator car motion profile 100 is illustrated in FIG. 1, wherein the elevator car is first accelerated from a departure landing 102 to a constant maximum speed, also known as maximum rated speed, and later decelerated from the maximum speed to stop smoothly to a destination landing 104. Typically, the speed of the elevator car is limited to a speed limit, which typically corresponds to the maximum speed added with a safety factor sf, e.g. the speed limit may be 115 percent of the maximum speed. The speed limit is illustrated in FIG. 1 with the dashed line 106. The speed limit 106 is constant along a whole hoistway.

The elevator comprises further a safety equipment, such as a safety buffer, arranged in a pit of a hoistway. The safety equipment is dimensioned to absorb kinetic energy of an elevator car, which moves at the maximum speed. Further, a separate buffer may be provided in the pit to absorb kinetic energy of the counterweight.

The elevator comprises also hoisting machinery brakes, which may be opened or closed to brake the movement of the elevator hoisting machine and thus also the movement of the elevator car. Further, the elevator comprises an overspeed governor, which actuates electrically hoisting machinery brakes to stop the elevator car if the speed of the elevator car exceeds the speed limit, for example 115 percent of the maximum speed of the elevator car. Furthermore, if the speed of the elevator car exceeds a second speed limit corresponding to the maximum speed added with a higher safety factor, e.g. the second speed limit may be 130 percent of the maximum speed, the overspeed governor actuates mechanically safeties (e.g. safety gear of elevator car) to stop the movement of the elevator car. Thus, causing that the overspeed governor activation may comprise two phases, i.e. the first actuation phase for minor overspeed (e.g. 115 percent of the maximum speed) and the second actuation phase for major overspeed (e.g. 130 percent of the maximum speed).

Typically, when there are several elevator cars with different maximum speeds travelling in separate hoistways in a same building, each one has a different overspeed governor with different triggering limit, as well as different pit safety equipment, e.g. with different dimensioning and structure. Because dimensioning of the pit safety equipment affects to the depth of the hoistway pit, hoistway pits with different depths are required in the same building.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a processing unit, a computer program, a computer-readable medium, and an elevator system for operating an elevator system. Another objective of the invention is that the method, the processing unit, the computer program, the computer-readable medium, and the elevator system for operating an elevator system is to enable different elevator car motion profiles for one elevator car in different operating situations.

The objectives of the invention are reached by a method, a processing unit, computer program, a computer-readable medium, and an elevator system as defined by the respective independent claims.

According to a first aspect, a method for operating an elevator system is provided, wherein the method comprises: receiving a request to drive an elevator car to a destination, and generating an elevator car motion profile to serve the received request, the elevator car motion profile comprising at least the following motion parameters of the elevator car: acceleration, maximum speed, and deceleration, wherein at least one of the maximum speed of the elevator car and the deceleration of the elevator car in the generated elevator car motion profile is defined on the basis of the destination.

If the destination is an extreme destination, the maximum speed of the elevator car in the generated elevator car motion profile may be lower than the maximum speed of the elevator car in the generated elevator car motion profile, if the destination is any other destination than the extreme destination.

Alternatively or in addition, if the destination is an extreme destination, the maximum deceleration of the elevator car in the generated elevator car motion profile may be lower than the maximum deceleration of the elevator car in the generated elevator car motion profile, if the destination is any other destination than the extreme destination.

The maximum speed and/or the maximum deceleration of the elevator car in the generated elevator car motion profile may be specific for each destination.

The method may further comprise controlling an elevator hoisting machine such that the elevator car speed is in accordance with the generated elevator car motion profile.

The method may further comprise monitoring the movement of the elevator car or the movement of a counterweight and in response to detecting that the speed of the elevator car or the speed of the counterweight exceeds an overspeed threshold, triggering one or more safety brakes to stop the movement of the elevator car and the counterweight.

According to a second aspect, a processing unit is provided, wherein the processing unit comprises one or more processors and one or more memories comprising instructions which, when executed by the one or more processors, cause the processing unit to perform: receive a request to drive an elevator car to a destination, and generate an elevator car motion profile to serve the received request, the elevator car motion profile comprising at least the following motion parameters of the elevator car: acceleration, maximum speed, and deceleration, wherein at least one of the maximum speed of the elevator car and the deceleration of the elevator car in the generated elevator car motion profile is defined on the basis of the destination.

If the destination is an extreme destination, the maximum speed of the elevator car may be the generated elevator car motion profile may be lower than the maximum speed of the elevator car in the generated elevator car motion profile, if the destination is any other destination than the extreme destination.

Alternatively or in addition, if the destination is an extreme destination, the maximum deceleration of the elevator car in the generated elevator car motion profile may be lower than the maximum deceleration of the elevator car in the generated elevator car motion profile, if the destination is any other destination than the extreme destination.

The maximum speed and/or the maximum deceleration of the elevator car in the generated elevator car motion profile may be specific for each destination.

The processing unit may further be configured to control an elevator hoisting machine such that the elevator car speed is in accordance with the generated elevator car motion profile.

The processing unit may be one of the following: an elevator control unit, a drive unit, a combined processing entity comprising a drive unit and at least part of an elevator control unit.

According to a third aspect, a computer program is provided, wherein the computer program comprises instructions to cause the processing unit described above to execute the method described above.

According to a fourth aspect, a computer-readable medium having stored thereon the computer program described above is provided.

According to a fifth aspect, an elevator system is provided, wherein the elevator system comprises: at least one elevator car, and a processing unit as described above.

The elevator system may further comprise an electronic overspeed monitoring equipment comprising: a safety controller communicatively connected to the elevator car or to a counterweight via a safety data bus, one or more brake control units, one or more safety brakes comprising triggering elements connected to the one or more brake control units, an absolute positioning system configured to provide continuously information representing movement of the elevator car or movement of the counterweight and is communicatively connected to the safety controller via the safety data bus, wherein the safety controller may be configured to: obtain the information representing movement of the elevator car or movement of the counterweight from the absolute positioning system, monitor the movement of the elevator car or the movement of the counterweight, and trigger one or more safety brakes to stop the movement of the elevator car (202) and the counterweight, if the speed of the elevator car or the counterweight is detected to meet an overspeed threshold.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 2:
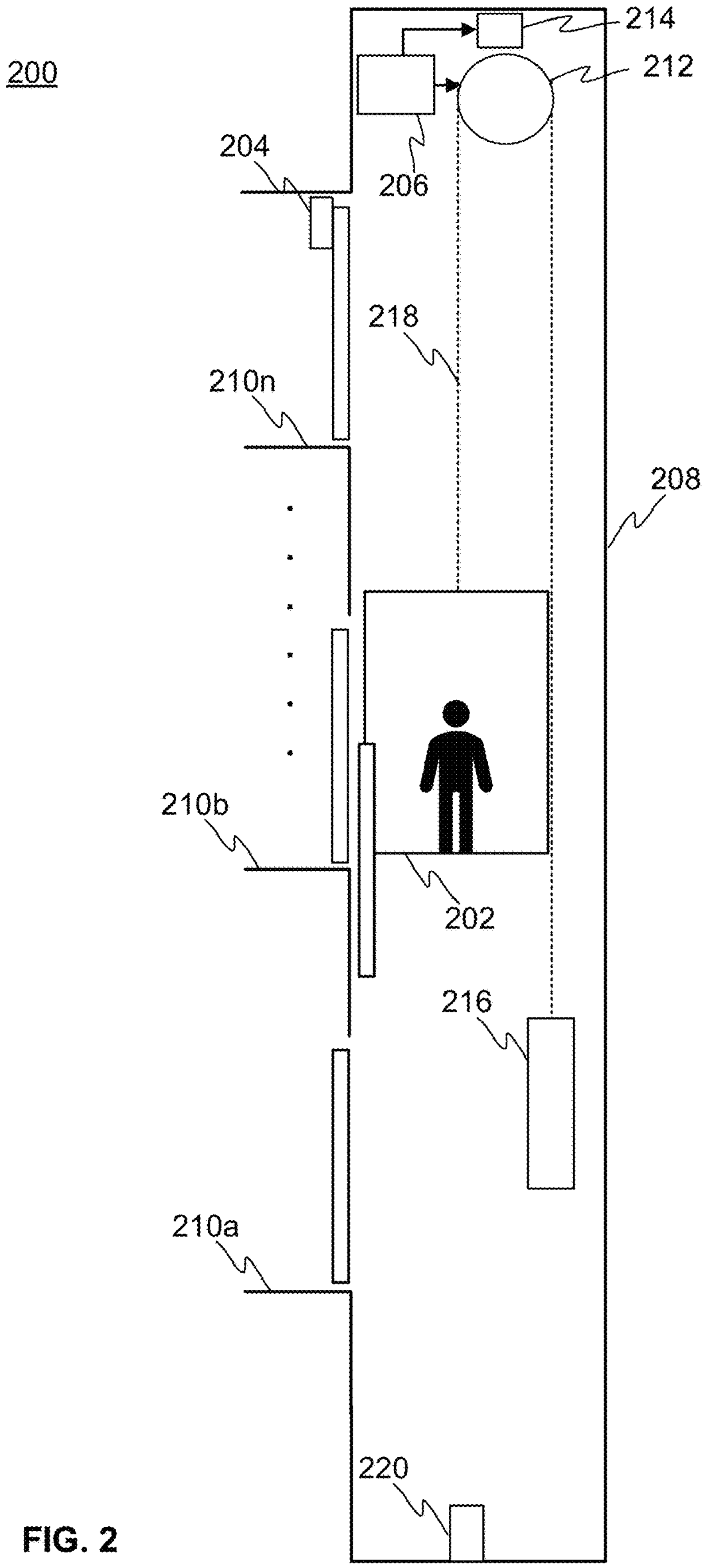
FIG. 2 illustrates schematically an example of an elevator system according to the invention.

FIG. 2 illustrates schematically an example of an elevator system 200 according to the invention, wherein the embodiments of the invention may be implemented as will be described. The elevator system 200 may comprise at least one elevator car 202, an elevator control unit 204, a drive unit 206, and an elevator hoisting machine. The example elevator system illustrated in FIG. 2 is a conventional rope-based elevator system 200 comprising hoisting ropes 218 or belt for carrying, i.e. suspending, the elevator car 202. A belt may comprise a plurality of hoisting ropes 218 travelling inside the belt. To carry the elevator car 202 the ropes 218 may be arranged to pass from the elevator car 202 over a pulley, i.e. a traction sheave, of the hoisting machine to a counterweight 216. In one to one (1:1) roping as illustrated in FIG. 2, the elevator car 202 may be arranged to one end of the ropes 218 and the counterweight 216 may be arranged to the other end of the ropes 218. With the 1:1 roping the elevator car 202, the counterweight 216, and the hoisting ropes 218 all travel at the same speed. Alternatively, in two to one (2:1) roping, one end of the hoisting ropes 218 passes from a dead end hitch arranged to a top end terminal of the hoistway 208 down and under an elevator car pulley(s), i.e. an elevator car sheave(s), up over the traction sheave of the hoisting machine, down around a counterweight pulley(s), i.e. counterweight sheave(s), and up to another dead end hitch arranged to the top end terminal of the hoistway 208*a*, 208*b*. With the 2:1 roping the speed of the elevator car 202*a*, 202*b* and the counterweight 220*a*, 220*b* is one half of the speed of the hoisting ropes. Moreover, one or more diverter pulleys may be used to direct the hoisting ropes 218 to the elevator car 202 and/or to the counterweight 216. For example, the counterweight 216 may be a metal tank with a ballast of weight approximately 40-50 percent of the weight of a fully loaded elevator car 202. The drive unit 206 is configured to control the elevator hoisting machine to drive the elevator car 202 along an elevator hoistway 208 between landings 210*a*-210*n*. The elevator control unit 204 is configured to control at least partly the operation of the elevator system 200, e.g. the elevator control unit 204 may control of the drive unit 206 to drive the elevator car 202. If the elevator system 200 comprises a machine room, the elevator control unit 204 may be arranged in the machine room of the elevator system 200. The machine room, i.e. motor room, may reside above the hoistway 208, at the bottom of the hoistway 208, or in the middle of the building adjacent to the hoistway 208. Alternatively, the elevator control unit 204 may be arranged to one landing, e.g. to a frame of a landing door at said one landing. Especially, in case the elevator system 200 is implemented as a machine-roomless elevator system, the elevator control unit 204 may be arranged to one landing, but also in case of the elevator system comprises the machine room, the elevator control unit 204 may be arranged to one landing. Alternatively, the elevator control unit 204 may be implemented as an external control unit, e.g. an external control unit residing in a technical room nearby the elevator system 200 inside the same building or inside another building than the elevator system 200, or a remote server, such as a cloud server or any other external server. In the example elevator system 200 of FIG. 2 the elevator control unit is arranged to the top-most landing 210*n*. The drive unit 206 may be arranged in the hoistway 208, e.g. in the overhead structure of the hoistway 208 as in the example elevator system 200 illustrated in FIG. 2. The drive unit 206 controls the elevator hoisting machine by supplying power from mains to an electrical motor 212 of the elevator hoisting machine to drive the elevator car 202. The elevator control unit 204 and the drive unit 206 may be implemented as separate entities. Alternatively, the elevator control unit 204 and the drive unit 206 may be implemented at least partly as a combined entity. The elevator system further comprises hoisting machinery brakes 214 to stop the movement of the elevator car 202.

According to another example of the invention the elevator system 200 may be a non-rope based elevator system. In a non-rope based elevator system instead of using hoisting ropes, the propulsion force to the elevator car 202 may be provided in a ropeless manner with a motor acting directly on the elevator car 202, such as a linear motor, track and pinion motor, or corresponding.

Next the different embodiments of the invention are described mainly referring to a conventional rope-based elevator system (e.g. the example elevator system 200 of FIG. 2), but the invention is not limited only to the conventional rope-based elevator systems and all the embodiments of the invention described in this application may also be implemented in a non-rope based elevator system.

Figure 3A:
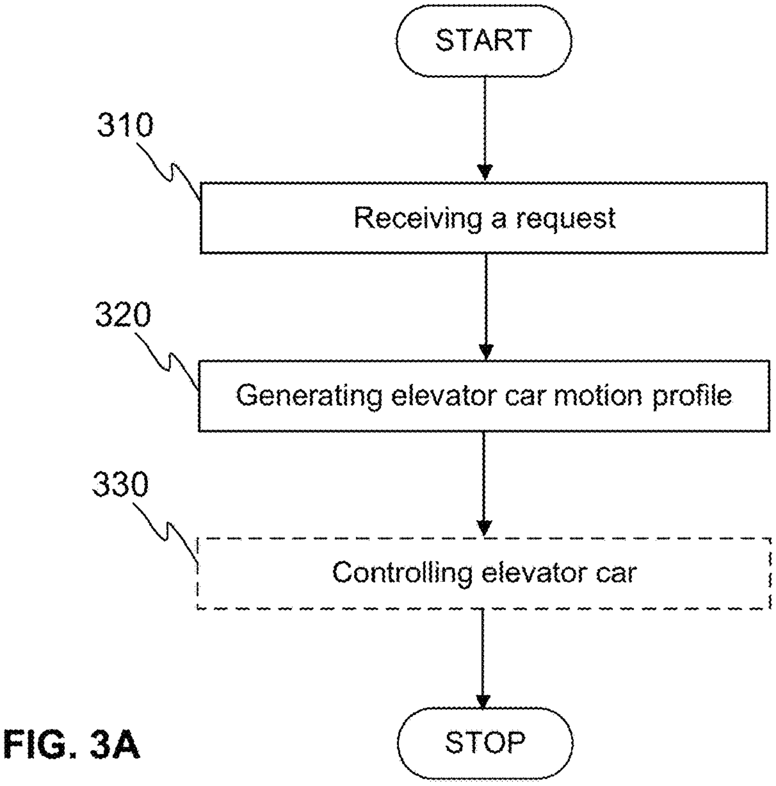
FIG. 3A illustrates schematically an example of a method according to the invention.

Next an example of a method for operating an elevator according to the invention is described by referring to FIG. 3A. FIG. 3A schematically illustrates the invention as a flow chart. At a step 310 a processing unit receives a request, e.g. a service request, to drive the elevator car 202 to a destination. The processing unit comprises the elevator control unit 204, the drive unit 206, or a combined processing entity comprising the drive unit 206 and at least partly the elevator control unit 204. The processing unit may receive the request from a call device in response to a user interaction, e.g. pushing of an elevator user interface button by the user. The elevator call device may be a car operating panel arranged inside the elevator car 202 for generating a request to drive the elevator car 202 to the destination landing. Alternatively or in addition, the call device may be a landing call panel arranged to each landing 210*a*-210*n* for generating a request to drive the elevator car to the landing 210*a*-210*n*, where the landing call panel from which the request is generated resides. Alternatively or in addition, the call device may be also a mobile terminal device, such as a mobile phone or a tablet computer, configured to communicate with the processing unit. If the processing unit comprises the drive unit 206, the drive unit 206 may receive the request from the call device via the elevator control unit 204.

At the step 320, in response receiving the request, the processing unit is configured to generate an elevator car motion profile to serve the received request. The elevator car motion profile comprises at least the following motion parameters of the elevator car: acceleration, maximum speed, and deceleration. The processing unit defines at least one of the maximum speed of the elevator car and the deceleration of the elevator car in the generated elevator car motion profile on the basis of the destination. Also, the position of the elevator car may be taken into account, when generating the elevator car motion profile, so that the elevator car following the elevator car motion profile will stop to right place at the destination.

If the destination is an extreme destination, the maximum speed of the elevator car 202 in the generated elevator car motion profile may be lower than the maximum speed of the elevator car 202 in the generated elevator car motion profile, if the destination is any other destination than the extreme destination. This enables that higher maximum speed may be used for the elevator car 202 configured to drive to a destination other than the extreme destinations. The extreme destination may be the top-most landing, e.g. landing 210*n* in FIG. 2, or the bottom-most landing, e.g. landing 210*a* in FIG. 2. Alternatively or in addition, if the destination is an extreme destination, the maximum deceleration of the elevator car 202 in the generated elevator car motion profile is lower than the maximum deceleration of the elevator car 202 in the generated elevator car motion profile, if the destination is any other destination than the extreme destination. When the deceleration of the elevator car 202 starts, the deceleration first gradually increases from zero to a maximum deceleration value, and after that gradually decreases from maximum deceleration back to zero when the elevator car 202 arrives to the destination landing. This allows that there are no sudden changes in the deceleration of the elevator car, which might feel uncomfortable for the passengers. According to an example embodiment of the invention, the elevator system may be provided with high-friction hoisting ropes, which enable higher maximum deceleration to other destinations than the extreme destination. In this case, said higher maximum deceleration may be for example 1 $m/s^2$-1.35 $m/s^2$. Consequently, the lower maximum deceleration to the extreme destination may be for example 0.7 $m/s^2$-1 $m/s^2$. Said high-friction hoisting ropes may be ropes or belts with a high-friction coating, such as a polyurethane coating. Without high friction coating ropes may start to slip on the traction sheave at the higher maximum decelerations.

Figure 1:
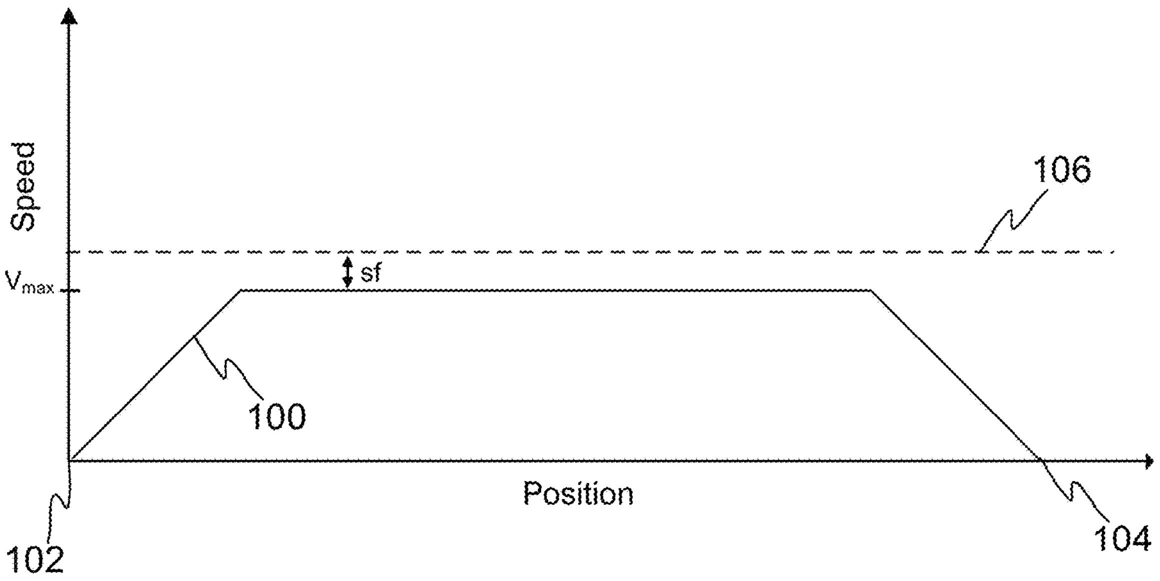
FIG. 1 Prior art
FIG. 1 illustrates schematically an example of an elevator car motion profile according to prior art.
Figure 4:
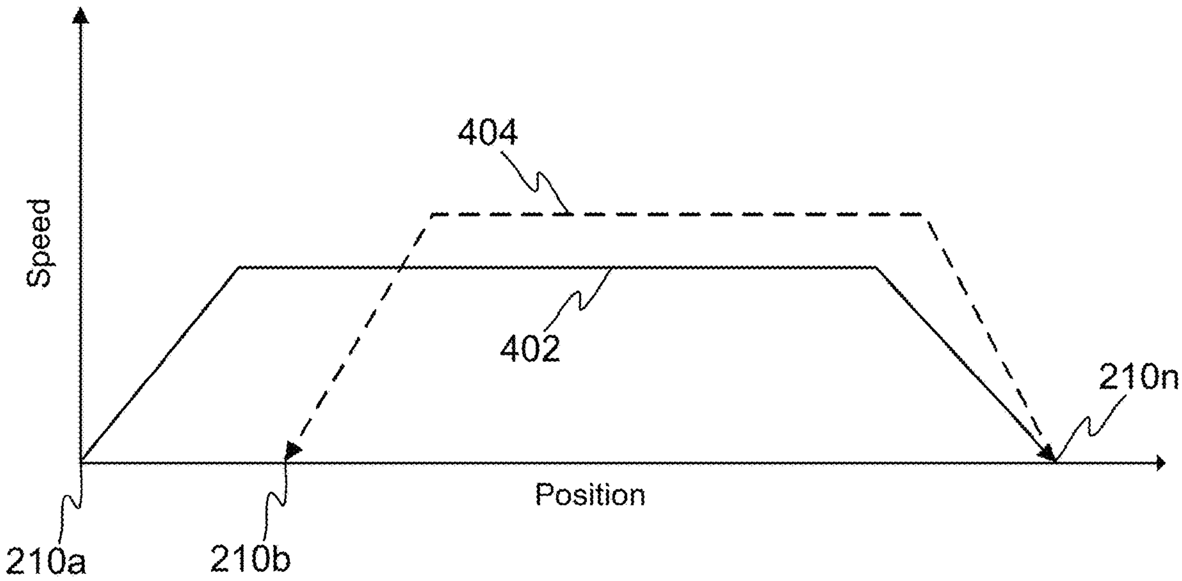
FIG. 4 illustrates schematically examples of elevator car motion profiles according to the invention.

The present invention enables that when the elevator car 202 is leaving from the extreme destination, the maximum speed of the elevator car 202 may be higher than the maximum speed of the elevator car 202 when the elevator car 202 is approaching to said extreme destination, e.g. the maximum speed of the elevator car approaching to the extreme destination may be 1 m/s and the speed of the elevator car leaving said extreme destination may be 2.5 m/s. In other words, the maximum speed of the elevator car 202 in the proximity of the extreme destination may be different depending on the direction of movement of the elevator car 202. Alternatively or in addition, the acceleration of the elevator car 202 leaving from the extreme destination may be higher than the deceleration of the elevator car 202 approaching the extreme destination. FIG. 4 illustrates some non-limiting examples of elevator car motion profiles according to the invention. In the example of FIG. 4, the processing unit is first configured to generate a first elevator car motion profile 402 in response to receiving a request to drive the elevator car 202 to the top-most landing 210*n*. The departure landing for the first elevator motion profile 402 is the bottom-most landing 210*a*. Next, the processing unit is configured to generate a second elevator car motion profile 404 in response to receiving a second request to drive the elevator car 202 to the second bottom-most landing 210*b*. The departure landing for the second elevator motion profile 404 is the top-most landing 210*n*. From the FIG. 4 it can be seen that the maximum speed of the elevator car 202 in the second elevator car motion profile 404 is higher than the maximum speed of the elevator car 202 in the first elevator car motion profile 402. Moreover, the acceleration of the elevator car 202 in the second elevator car motion profile 404 is higher than the deceleration of the elevator car 202 in the first elevator car motion profile 402. Furthermore, the deceleration of the elevator car 202 in the second elevator car motion profile 404 is higher than the deceleration of the elevator car 202 in the first elevator car motion profile 404. By defining the deceleration lower in the extreme destination than the acceleration it may be ensured that the speed and thus kinetic energy of the approaching elevator car 202 is smaller in the proximity of the end of the hoistway to ensure that the elevator car speed may be decelerated enough before hitting a pit safety equipment 220, such as a safety buffer, arranged in a pit of the hoistway 208.

According to an example embodiment of the invention, the maximum speed of the elevator car 202 and/or the maximum deceleration of the elevator car 202 in the generated elevator car motion profile may be specific, i.e. respective, for each destination, not only for the extreme destinations. This enables that the maximum speed of the elevator car 202 and/or the maximum deceleration of the elevator car 202 may be defined to be different for each destination.

Figure 3B:
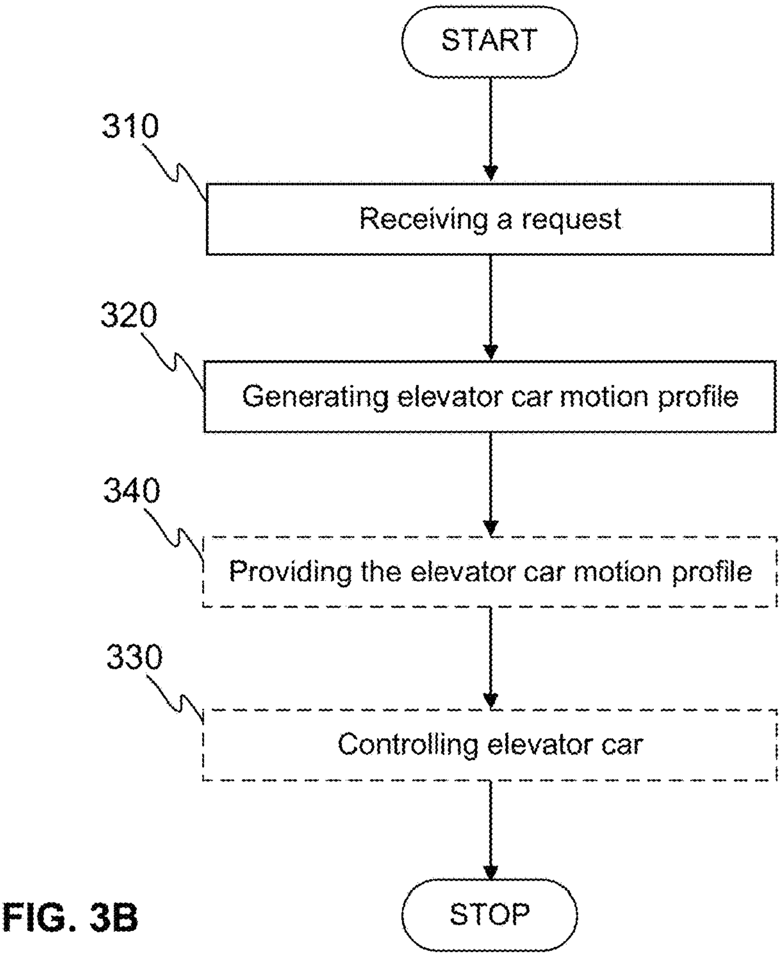
FIG. 3B illustrates schematically another example of a method according to the invention.

The method according to an example embodiment of the invention may further comprise controlling 330 the elevator hoisting machine such that the speed of the elevator car 202 is in accordance with the generated elevator car motion profile. The drive unit 206 supplies power to the electrical motor 212 of the hoisting machine to drive the elevator car 202 according to the generated elevator car motion profile. If the processing unit comprises the elevator control unit 204, i.e. the elevator control unit 204 is configured to generate the motion profile, the processing unit is configured to control the elevator hoisting machine such that the speed of the elevator car 202 is in accordance with the generated elevator car motion profile indirectly via the drive unit 206. The method may comprise providing 340 the generated elevator car motion profile to the drive unit 206, which then controls the elevator hoisting machine such that the speed of the elevator car 202 is in accordance with the generated elevator car motion profile as illustrated in an example of the method according to the invention of FIG. 3B.

According to an example embodiment of the invention, the method may further comprise monitoring the movement of the elevator car 202 or the movement of the counterweight 216 and in response to detecting that the speed of the elevator car 202 or the speed of the counterweight 216 exceeds an overspeed threshold, triggering one or more safety brakes, i.e. the hoisting machinery brakes 214 and/or elevator car brakes, to stop the movement of the elevator car 202 and the counterweight 216. The overspeed threshold is a continuous curve, which decreases towards a pit of the hoistway and/or an overhead structure in a top end terminal of the hoistway 208 such that the triggering takes place with lower speeds as the elevator car 202 approaches the pit and/or the overhead structure. In other words, the overspeed threshold varies depending on the position of the elevator car 202 inside the hoistway 208 so that the overspeed threshold is lower in the vicinity of the pit 606 and/or the overhead structure than in the middle section of the hoistway 208 enabling efficient and safe overspeed monitoring of the elevator car 202 travelling in accordance with different elevator car motion profiles 402, 404 generated to the same elevator car depending on the destination landing. The monitoring of the movement of the elevator car 202 or the movement of the counterweight 216 by means of an electronic overspeed monitoring equipment will be described later in this application.

Above the invention is described mainly referring to the method for operating the elevator system, but the invention relates also to the elevator system 200 comprising at least one elevator car 202 and the processing unit configured to perform one or more method steps described above.

Figure 5:
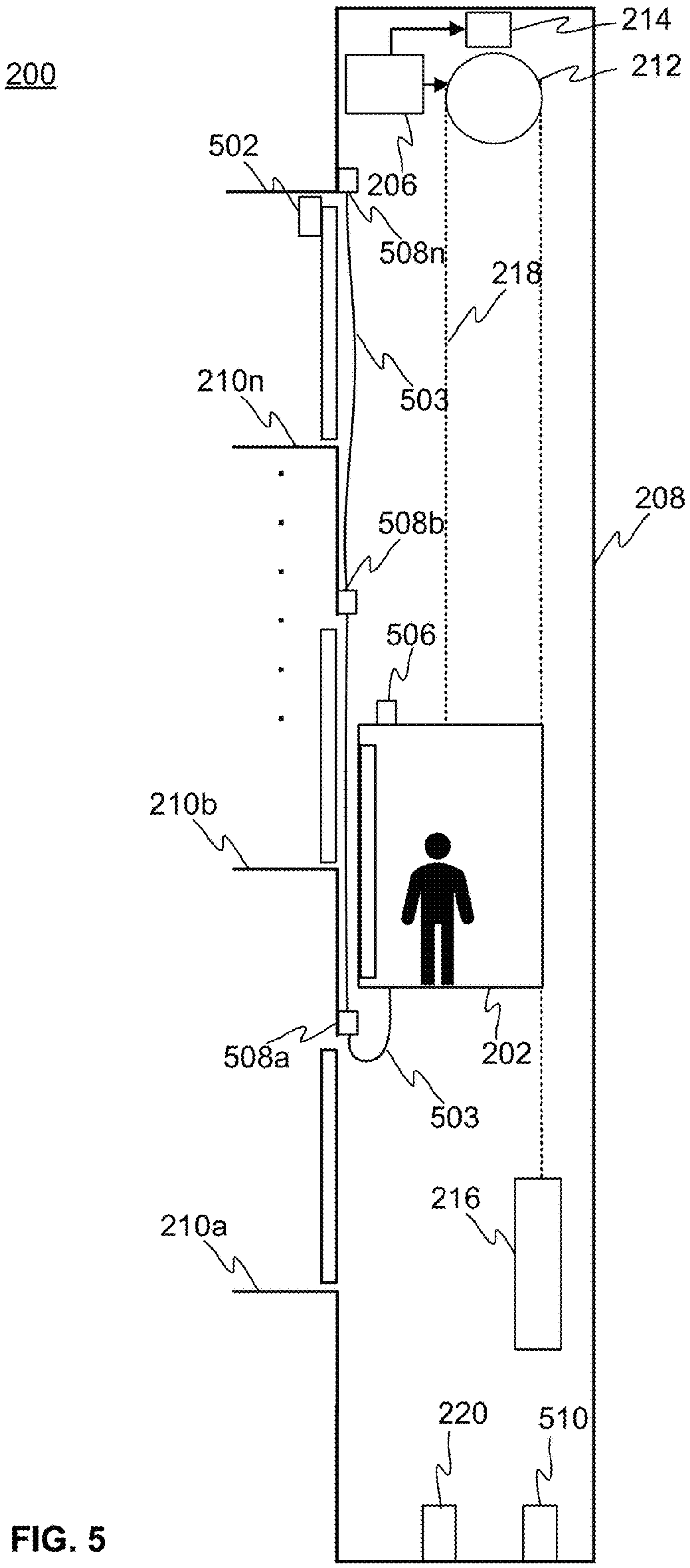
FIG. 5 illustrates schematically an example implementation of an electronic overspeed monitoring equipment in an elevator system according to the invention.

The elevator system 200 according to the invention may further comprise an electronic overspeed monitoring equipment for monitoring the movement of the elevator car 202 or the movement of the counterweight 216. The electronic overspeed monitoring equipment may comprise a safety controller 502 communicatively connected to the elevator car 202 via a safety data bus and an absolute positioning system. The safety data bus may run inside a travelling cable 503 as shown in FIG. 5. Alternatively, the safety data bus may be implemented wirelessly, e.g. via an electromagnetic radio signal. The electronic overspeed monitoring equipment may be used for safe elevator operation in the proximity of at least one extreme destination. The electronic overspeed monitoring equipment further comprises one or more brake control units and one or more safety brakes. The one or more safety brakes may comprise the hoisting machinery brakes 214 of the elevator system 200 and/or elevator car brakes (not shown in FIG. 5) arranged to the elevator car 202.

The elevator car 202 may comprise a first brake control unit for controlling the elevator car brakes. The first brake control unit is connected to the elevator car brakes via cables. The elevator car brakes are holding brakes for holding the elevator car 202 every time the elevator car 202 stops to a landing. The elevator car brakes engage against guide rails of the elevator car 202 in a prong-like manner. The elevator car brakes comprise triggering elements connected to the first brake control unit. The triggering elements of the elevator car brakes may comprise e.g. electromagnets. Alternatively, the triggering elements of the elevator car brakes may comprise linear actuators, such as spindle motor. In case of a hydraulic or a pneumatic brake, the triggering elements of the elevator car brakes may comprise an electrically controllable valve. The elevator car brakes are closed every time the elevator car 202 stops to a landing and the elevator car brakes are opened when the elevator car 202 starts to move again, e.g. according to a newly generated elevator car motion profile. The elevator car brakes are used especially in mid-rise and high-rise elevator systems. In low-rise elevator systems the hoisting machinery brakes 214 may be adequate for holding brakes, but elevator brakes may also be used in the low-rise elevator systems. The mid-rise and high-rise elevator systems are implemented in e.g. high buildings comprising a large number of landings, such as travel heights above 15-100 meters, and the low-rise elevator system are implemented in e.g. lower buildings comprising smaller number of landings, such as travel heights up to 15 meters. The safety controller 502, may be arranged to one landing 210*a*-210*n*, e.g. to a frame of a landing door at said one landing 210*a*-210*n*.

The drive unit 206 may comprise a second brake control unit for controlling the hoisting machinery brakes 214. The hoisting machinery brakes 214 comprises triggering elements connected to the brake control unit. The triggering elements may comprise e.g. electromagnets. The hoisting machinery brakes 214 may be opened when the brake control unit supplies current to the triggering elements and the hoisting machinery brakes 214 may be closed when current supply to the triggering elements is interrupted. The second brake control unit is connected to the triggering elements of the hoisting machinery brakes 214 via cables.

The safety controller 502 may be configured to monitor the movement of the elevator car 202 or a counterweight 216 in the proximity of at least one extreme destination, e.g. within a section of the hoistway 208, where the speed of the elevator car 202 or the counterweight 216 approaching to the pit of the hoistway 208 and/or the overhead structure in the top end terminal of the hoistway 208 is decelerated from the maximum speed. The safety controller 502 may receive information representing the movement of the elevator car 202 or the counterweight 216 from the absolute elevator positioning system. The absolute positioning system may comprise an encoder and a door zone sensor system and is communicatively connected to the safety controller 502 via the safety data bus The encoder may be configured to provide continuously position information of the elevator car 202 or the counterweight 216. The encoder may be arranged to the elevator car 202 in association with elevator car pulley(s) or at least one guide roller, i.e. guide shoe, interposed between the elevator car 202 and a guide rail to provide continuous position information of the elevator car 202. Alternatively, the encoder may be in association with a governor pulley of a mechanical overspeed governor to provide continuous position information of the elevator car 202. The elevator car 202 may be provided also with a mechanical overspeed governor (OSG) in addition to the electronic overspeed monitoring equipment that is configured to perform the overspeed monitoring. The overspeed governor may be arranged inside the hoistway 208. The overspeed governor may comprise a governor pulley, i.e. a sheave, rotated by a governor rope that forms a closed loop and is coupled to the elevator car 202 so that the governor rope moves with the elevator car 202 at the same speed, i.e. the rotating speed of the governor pulley corresponds to the speed of the elevator car 202. The governor pulley may be arranged for example to the upper end of the governor rope loop. Alternatively, the encoder may be arranged to the counterweight 216 in association with counterweight pulley(s) or at least one second guide roller interposed between the counterweight 216 and the second guide rail to provide continuous position information of the counterweight 216. At least one first guide rail is arranged vertically in the hoistway to guide and direct the course of travel of the elevator car 202. At least one guide roller may be interposed between the elevator car 202 and the first guide rail to ensure that the lateral motion of the elevator car 202 may be kept at a minimum as the elevator car 202 travels along the first guide rail. Furthermore, a second guide rail may be arranged vertically in the hoistway 208 to guide and direct the course of travel of the counterweight 216. At least one guide roller may be interposed between the counterweight 216 and the second guide rail to ensure that the lateral motion of the counterweight 216 is kept at a minimum as the counterweight 216 travels along the second guide rail. The encoder may be a magnetic encoder, e.g. quadrature sensor, such as a Hall sensor, comprising a magnetic wheel, e.g. magnetic ring, mounted concentrically with an elevator car pulley, counterweight pulley, a guide roller, or a governor pulley of an overspeed governor. The encoder may be configured to measure incremental pulses from the rotating magnet wheel in order to provide the position information of the elevator car 202 or the counterweight 216. The position information may be obtained continuously regardless of the place of the elevator car 202 or the counterweight 216 in the elevator hoistway 208. The magnetic wheel may comprise alternating evenly spaced north and south poles around its circumference. The encoder may have an A/B quadrature output signal for the measurement of magnetic poles of the magnetic wheel. Furthermore, the encoder may be configured to detect changes in the magnetic field as the alternating poles of the magnetic wheel pass over it. The output signal of the quadrature sensor may comprise two channels A and B that may be defined as pulses per revolution (PPR). Furthermore, the position in relation to the starting point in pulses may be defined by counting the number of pulses. Since, the channels are in quadrature more, i.e. 90 degrees phase shift relative to each other, also the direction the of the rotation may be defined.

The door zone sensor system may comprise a reader device 506, e.g. a Hall sensor, arranged to the elevator car 202 or to the counterweight 216 and a target, preferably a magnet, 508*a*-508*n* arranged to the hoistway 208 within a door zone of each landing 210*a*-210*n*. The door zone may be defined as a zone extending from a lower limit below floor level to an upper limit above the floor level in which the landing door and car door equipment are in mesh and operable. The door zone may be determined to be from −400 mm to +400 mm for example. Preferably, the door zone may be from −150 mm to +150 mm. The reader 506 arranged to the elevator car 202 may obtain door zone information of the elevator car 202, when the elevator car passes one of the targets 508*a*-508*n*. Alternatively, the reader 506 arranged to the counterweight 216 may obtain door zone information of the counterweight 216, when the counterweight 216 passes one of the targets 508*a*-508*n*. The information representing the movement of the elevator car 202 or the counterweight 216 comprises the obtained door zone information of the elevator car 202 or the counterweight 216 and the continuous position information of the elevator car 202 or the counterweight 216.

The safety controller 502 may monitor the movement of the elevator car 202 or the counterweight 216 in the proximity of the at least one extreme destination. FIG. 5 illustrates schematically an example implementation of the electronic overspeed monitoring equipment in the elevator system 200 for monitoring the movement of the elevator car 202. Alternatively, the electronic overspeed monitoring equipment may be implemented in the elevator system 200 for monitoring the movement of the counterweight 216. The elevator system 200 is otherwise similar to the elevator system 200 illustrated in FIG. 2, but the elevator system 200 of FIG. 5 comprises further the parts of the electronic overspeed monitoring equipment. If the safety controller 502 detects that the speed of the elevator car 202 meets an overspeed threshold, the safety controller 502 triggers the one or more safety brakes, i.e. hoisting machinery brakes 214 and/or elevator car brakes, to stop the movement of the elevator car 202. The overspeed threshold 602 is a continuous curve, which decreases towards a pit 606 of the hoistway 208 and/or the overhead structure in the top end terminal of the hoistway 208 such that the triggering takes place with lower speeds as the elevator car 202 approaches the pit 606 and/or the overhead structure. In other words, the overspeed threshold 602 varies depending on the position of the elevator car 202 inside the hoistway 208 so that the overspeed threshold is lower in the vicinity of the pit 606 and/or the overhead structure than in the middle section of the hoistway 208 to enable overspeed monitoring of the elevator car 202 travelling in accordance with different elevator car motion profiles generated to the same elevator car depending on the destination landing. Higher speed of the elevator car 202 may be allowed in the middle section of the hoistway 208 than in the vicinity of the pit 606 and/or the overhead structure. When the elevator car 202 is travelling at the maximum speed $v_{max}$ the overspeed threshold 602 is above the maximum speed $v_{max}$, i.e. the overspeed threshold 602 may be added with a safety factor sf, e.g. 115 percent of the maximum speed, and when the speed of the elevator car 202 starts to decrease when the elevator car is approaching to the pit or the overhead structure, the overspeed threshold starts to decrease and at the position of the pit 606 and/or the overhead structure, the overspeed threshold 602 levels to a lower limit 603 of the overspeed threshold 602, which may be a lower maximum speed $v_2$ added with a safety factor sf, e.g. 115 percent of the lower maximum speed $v_2$. The safety factor added to the maximum speed $v_{max}$ and to the lower maximum speed $v_2$ may be the same safety factor or different safety factor.

As discussed in the background, in the prior art solutions the pit safety equipment is dimensioned to absorb or store the kinetic energy of the elevator car travelling at the maximum speed in order to be able to safely stop the movement of the elevator car. Dimensioning of the pit safety equipment means in case of buffers dimensioning a buffer stroke, i.e. the distance that the buffer may be compressed. In other words, the pit safety equipment may be dimensioned according to the maximum speed of the elevator car or alternatively the maximum speed of the elevator car may be defined according to the dimensions of the pit safety equipment. The higher the maximum speed of the elevator car is, the longer the buffer stroke needs to be in order to absorb or store the kinetic energy of the elevator car travelling at the maximum speed. Furthermore, the dimensioning of the pit safety equipment affects also to the depth of the pit, because the safety element needs to be fitted in the pit. Thus, the longer the buffer stroke is, the deeper the pit needs to be. The safety equipment of the counterweight may be dimensioned similarly to absorb kinetic energy of the counterweight.

The electronic overspeed equipment according to the invention with the decreasing overspeed threshold enables that the pit safety equipment 220, 510 may be dimensioned to absorb or store the kinetic energy of the elevator car or the counterweight 216 travelling at the lower maximum speed $v_2$, because the electronic overspeed equipment is configured to monitor the movement of the elevator car 202 or the counterweight 216 approaching to the pit 606 (and/or the overhead structure) so that the speed of the elevator car 202 or the counterweight 216 does not exceed the lower limit 603 of the overspeed threshold at the position of the pit 606. The lower maximum speed $v_2$ may be substantially lower than the maximum speed $v_{max}$ of the elevator car 202. This means that the pit safety equipment 220, 510 may be dimensioned according to the lower maximum speed $v_2$ instead of the maximum speed $v_{max}$ of the elevator car 202, which leads to a reduced buffer stroke. Thus, the electronic overspeed equipment according to the invention enables the use of reduced safety equipment 510, e.g. reduced buffers of the elevator car 202 and the counterweight 216, and also a reduced pit depth.

Figure 6:
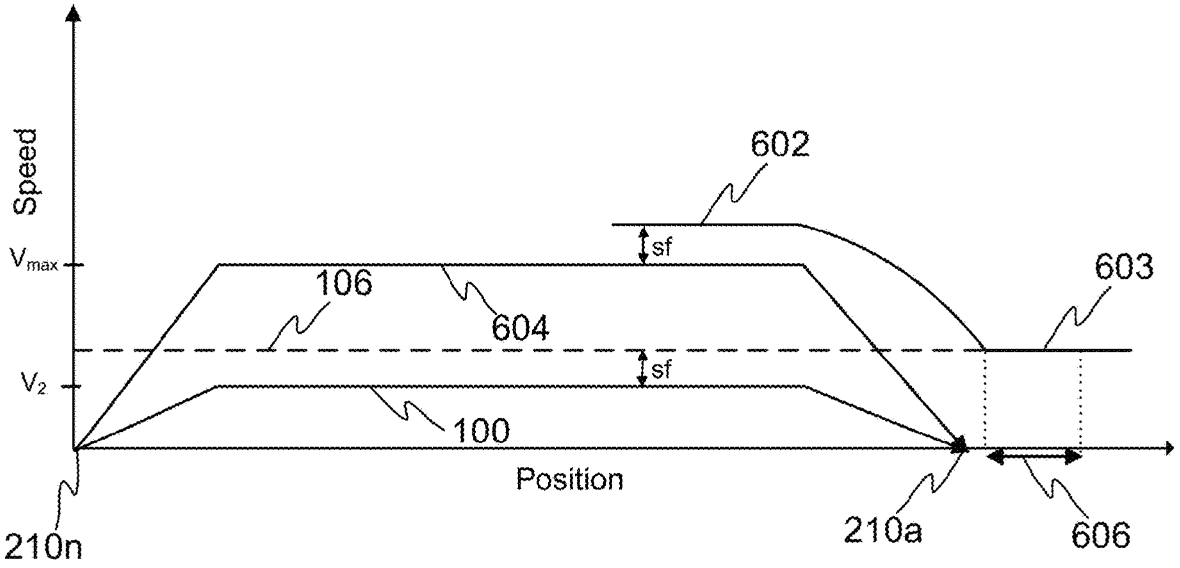
FIG. 6 illustrates schematically an example of a triggering limit according to the invention.

An example of the overspeed threshold 602 according to the invention is illustrated in FIG. 6, wherein the overspeed threshold 602 is decreasing towards the pit 606 of the hoistway 208. In FIG. 6 also an example of an elevator car motion profile 604 is illustrated, wherein the elevator car is first accelerated from a departure landing (in this example the top-most landing 210*n*) to a maximum speed $v_{max}$, and later decelerated from the maximum speed $v_{max}$ to stop smoothly to a destination landing (in this example the bottom-most landing 210*a*). The movement of the elevator car 202 is monitored with the electronic overspeed monitoring equipment in the proximity of the bottom-most landing 210*a*, i.e. in the proximity of the pit 606 of the hoistway 208, in the example FIG. 6. However, alternatively or in addition the movement of the elevator car 202 may be monitored with the electronic overspeed monitoring equipment in the proximity of the top-most landing 210*n*. The pit safety equipment 220 of the elevator car 202 and the pit safety equipment 510 of the counterweight 216 and the pit depth are dimensioned according to the lower maximum speed $v_2$ as discussed above. As a comparison FIG. 6 illustrates also an elevator car motion profile 100 and a traditional constant speed limit 106, e.g. 115 percent of the maximum speed, used with traditional mechanical overspeed governor for an elevator car 202 travelling inside a same hoistway comprising the same pit depth and similarly dimensioned pit safety equipment 220, 510. According to the traditional elevator car motion profile 100, the elevator car is first accelerated from a departure landing 210*n* to a maximum speed, and later decelerated from the maximum speed to stop smoothly to a destination landing 210*a*. The dimensions of the pit safety equipment 220, 510 limit the maximum speed of the traditional elevator car motion profile 100 to the lower maximum speed $v_2$, which causes that the maximum speed of the traditional elevator car motion profile 100 and thus also the traditional constant speed limit 106 are substantially lower than the maximum speed $v_{max}$ and the overspeed threshold 602 according to the invention. If the elevator car motion profile with the traditional overspeed governor is required to be the same as the elevator car motion profile 604 according to the invention, it would mean that the pit safety equipment should be dimensioned according to the maximum speed $v_{max}$ causing that the pit safety equipment should be longer and the pit depth deeper than in the example according to the invention, wherein the pit safety equipment and the pit depth are dimensioned according to the lower maximum speed $v_2$.

Figure 7:
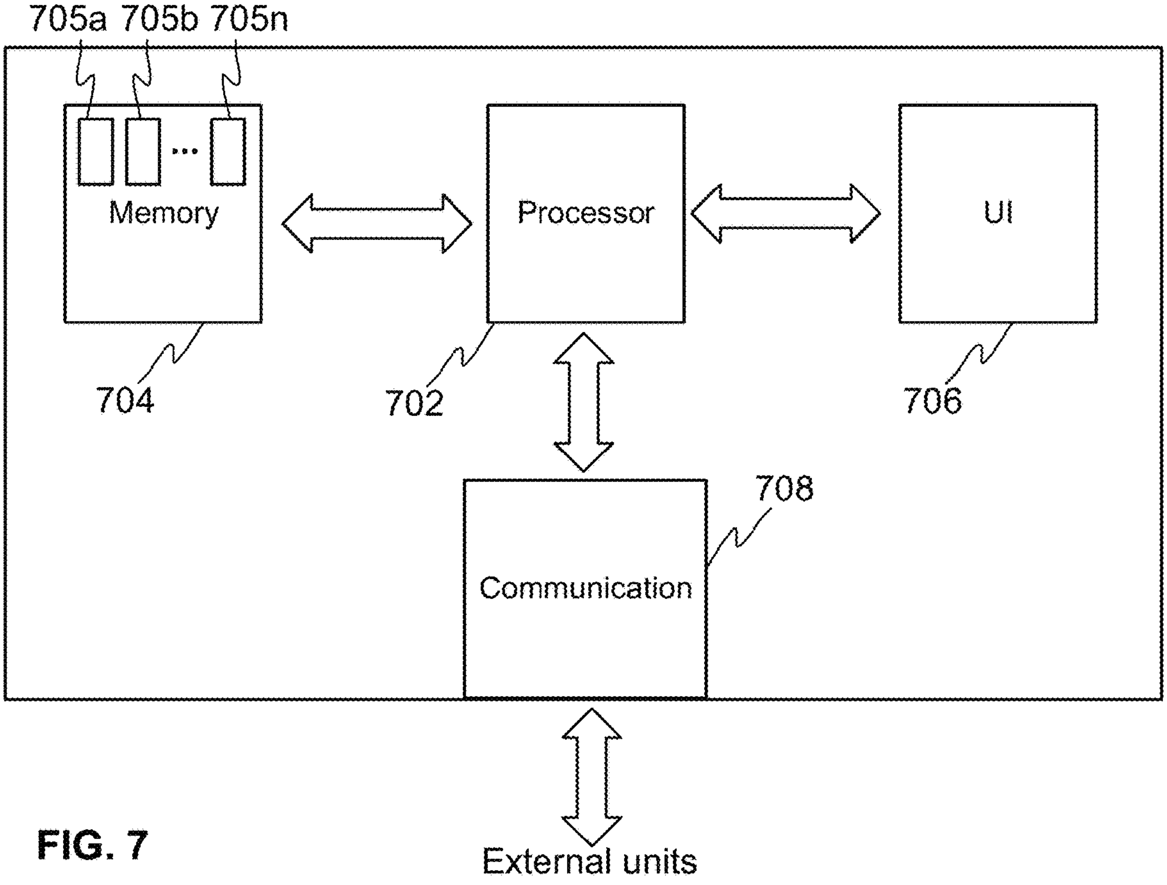
FIG. 7 schematically illustrates an example of a processing unit according to the invention.

FIG. 7 schematically illustrates an example of the processing unit according to the invention. The processing unit may comprise one or more processors 702, one or more memories 704, a communication unit 708 comprising one or more communication devices, and a user interface (UI) 706. The mentioned elements of may be communicatively coupled to each other with e.g. an internal bus. The one or more processors 702 may be any suitable processor for processing information and control the operation of the processing unit, among other tasks. The one or more memories 704 may store portions of computer program code 705*a*-705*n* and any other data, and the one or more processors 702 may cause the processing unit to operate as described by executing at least some portions of the computer program code 705*a*-705*n* stored in the one or more memories 704. Furthermore, the one or more memories 704 may be volatile or nonvolatile. Moreover, the one or more memories 704 are not limited to a certain type of memory only, but any memory type suitable for storing the described pieces of information may be applied in the context of the invention. The communication unit 708 may be based on at least one known communication technologies, either wired or wireless, in order to exchange pieces of information as described earlier. The communication unit 708 provides an interface for communication with any external unit, such as database and/or any external systems. The user interface 706 may comprise I/O devices, such as buttons, keyboard, touch screen, microphone, loudspeaker, display and so on, for receiving input and outputting information.

Some aspects of the invention may relate to a computer program 705*a*-705*n* stored in the one or more memories 704 of the processing unit 204. The implementation of the method according to the present invention as described above may be arranged so that computer program 705*a*-705*n* comprising machine-readable instructions is stored in the one or more memories 704 of the processing unit 204 and when the computer program code 705*a*-705*n* is executed by the one or more processors 702, the processing unit is caused to perform one or more method steps described above.

The computer program may be stored in a tangible non-volatile computer readable medium, e.g. an USB stick, a CD-ROM disc, a DVD disc, a Blu-ray disc or another article of manufacture that tangibly embodies the computer program, which is accessible at least by the one or more processors 702 of the processing unit 204. The computer program may also be loaded from a remote server via a remote link.

Above, the invention is described above so that it is implemented in an elevator system 200 comprising one elevator car, but the invention may be implemented also in an elevator system comprising a plurality of elevator cars adapted to travel in separate hoistways, i.e. an elevator group.

The present invention as hereby described provides great advantages over the prior art solutions. For example, the present invention improves at least partly the safety of the elevators. Moreover, the present invention enables that different elevator car motion profiles with different motion parameters may be used for one elevator car in different operating situations. The present invention improves transport capacity of the elevator system and decreases travel time of the elevator car, but within the safety boundaries.

The verb "meet" in context of an overspeed threshold or a speed limit is used in this patent application to mean that a predefined condition is fulfilled. For example, the predefined condition may be that the overspeed threshold is reached and/or exceeded.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for operating an elevator system, the method comprising:

receiving, at a safety controller, a request to drive an elevator car to a destination;

generating, at the safety controller, an elevator car motion profile to serve the received request, the elevator car motion profile including motion parameters of the elevator car, the motion parameters of the elevator car including at least acceleration of the elevator car, a target maximum speed of the elevator car, and deceleration of the elevator car, wherein at least one of the target maximum speed of the elevator car and the deceleration of the elevator car in the generated elevator car motion profile is defined based on the destination;

monitoring, at the safety controller, a movement of the elevator car or a movement of a counterweight in a hoistway based on processing information provided continuously by an absolute positioning system communicatively connected to the safety controller via a safety data bus, the information representing the movement of the elevator car or the movement of the counterweight, the information including both of continuous position information of the elevator car or the counterweight, the continuous position information received from an encoder, and door zone information receive from a door zone sensor system, the door zone sensor system including a reader device arranged to the elevator car or the counterweight, the door zone sensor system further including a plurality of targets arranged to the hoistway within separate, respective landing zones of a plurality of landings, the door zone information received from the reader device based on the elevator car or the counterweight causing the reader device to pass at least one target of the plurality of targets; and triggering, at the safety controller, one or more safety brakes to stop the movement of the elevator car and the movement of the counterweight, in response to detecting that, when the elevator car is at a given position in the hoistway, a speed of the elevator car or a speed of the counterweight at least meets a value of an overspeed threshold that corresponds to the given position of the elevator car in the hoistway, wherein the overspeed threshold is a continuous curve that varies based on both the target maximum speed of the elevator car and elevator car position in the hoistway, such that the overspeed threshold has an upper limit corresponding to elevator car positions in the hoistway at which the elevator car is to move at the target maximum speed according to the generated elevator car motion profile, the upper limit being greater than the target maximum speed of the elevator car by a safety factor, and a lower limit corresponding to elevator car positions in the hoistway that are proximate to a pit of the hoistway or an overhead structure in a top end terminal of the hoistway, the target maximum speed being greater than the lower limit, and wherein the elevator system includes a pit safety equipment dimensioned according to the overspeed threshold corresponding to the lower limit, wherein the safety data bus extends within a travelling cable that extends along the hoistway to be connected to the plurality of targets and is connected at one end to the elevator car.

2. The method according to claim 1, wherein if the destination is an extreme destination, the maximum speed of the elevator car in the generated elevator car motion profile is a first maximum speed, and if the destination is any other destination than the extreme destination, the target maximum speed of the elevator car in the generated elevator car motion profile is a second maximum speed, and the first maximum speed is lower than the second maximum speed.

3. The method according to claim 1, wherein if the destination is an extreme destination, the maximum deceleration of the elevator car in the generated elevator car motion profile is a first maximum deceleration, if the destination is any other destination than the extreme destination, the maximum deceleration of the elevator car in the generated elevator car motion profile is a second maximum deceleration, and the first maximum deceleration is lower than the second maximum deceleration.

4. The method according to claim 1, wherein the target maximum speed and/or the deceleration of the elevator car in the generated elevator car motion profile are specific for each destination.

5. The method according to claim 1, further comprising:

controlling an elevator hoisting machine such that the elevator car speed of the elevator car is in accordance with the generated elevator car motion profile.

6. An elevator system, comprising:

an elevator car;

a counterweight;

a safety controller communicatively connected to the elevator car or to the counterweight via a safety data bus;

one or more brake control units;

one or more safety brakes including triggering elements connected to the one or more brake control units; and an absolute positioning system configured to provide continuously information representing a movement of the elevator car or a movement continuously information representing a movement of the elevator car or a movement of the counterweight, the absolute positioning system communicatively connected to the safety controller via the safety data bus, the absolute positioning system including an encoder configured to generate continuous position information of the elevator car or the counterweight, and a door zone sensor system configured to generate door zone information, the door zone sensor system including a reader device arranged to the elevator car or the counterweight, and a plurality of targets arranged to a hoistway within separate, respective landing zones of a plurality of landings, the door zone information generated by the reader device based on the elevator car or the counterweight causing the reader device to pass at least one target of the plurality of targets, P1 wherein the absolute positioning system is configured to continuously provide information representing the movement of the elevator car or the movement of the counterweight, such that the information representing the movement of the elevator car or the movement of the counterweight includes both the continuous position information and the door zone information, wherein the safety controller includes one or more memories storing a computer program including instruction, and one or more processors configured to execute the computer program to cause the safety controller to receive a request to drive the elevator car to a destination, generate an elevator car motion profile to serve the received request, the elevator car motion profile including motion parameters of the elevator car, the motion parameters of the elevator car including at least acceleration of the elevator car, a target maximum speed of the elevator car, and deceleration of the elevator car, wherein at least one of the target maximum speed of the elevator car and the deceleration of the elevator car in the generated elevator car motion profile is defined based on the destination, monitor the movement of the elevator car or the movement of the counterweight in the hoistway based on processing the information provided continuously by the absolute positioning system, and trigger the one or more safety brakes to stop the movement of the elevator car and the movement of the counterweight, in response to detecting that, when the elevator car is at a given position in the hoistway, a speed of the elevator car or a speed of the counterweight at least meets a value of an overspeed threshold that corresponds to the given position of the elevator car in the hoistway, wherein the overspeed threshold is a continuous curve that varies based on both the target maximum speed of the elevator car and elevator car position in the hoistway, such that the overspeed threshold has an upper limit corresponding to elevator car positions in the hoistway at which the elevator car is to move at the target maximum speed according to the generated elevator car motion profile, the upper limit being greater than the target maximum speed of the elevator car by a safety factor, and a lower limit corresponding to elevator car positions in the hoistway that are proximate to a pit of the hoistway or an overhead structure in a top end terminal of the hoistway, the target maximum speed being greater than the lower limit, and wherein a pit safety equipment is dimensioned according to the overspeed threshold corresponding to the lower limit, wherein the safety data bus extends within a travelling cable that extends along the hoistway to be connected to the plurality of targets and is connected at one end to the elevator car.

7. The elevator system according to claim 6, wherein if the destination is an extreme destination, the target maximum speed of the elevator car in the generated elevator car motion profile is a first maximum speed, and if the destination is any other destination than the extreme destination, the target maximum speed of the elevator car in the generated elevator car motion profile is a second maximum speed, and the first maximum speed is lower than the second maximum speed.

8. The elevator system according to claim 6, wherein
if the destination is an extreme destination, a maximum deceleration of the elevator car in the generated elevator car motion profile is a first maximum deceleration,
if the destination is any other destination than the extreme destination, the maximum deceleration of the elevator car in the generated elevator car motion profile is a second maximum deceleration, and
the first maximum deceleration is lower than the second maximum deceleration.

9. The elevator system according to claim 6, wherein the target maximum speed and/or a maximum deceleration of the elevator car in the generated elevator car motion profile are specific for each destination.

10. The elevator system according to claim 6, further configured to control an elevator hoisting machine such that an elevator car speed of the elevator car is in accordance with the generated elevator car motion profile.

11. The elevator system according to claim 6, wherein the safety controller is one of an elevator control unit, a drive unit, a combined processing entity including the drive unit and at least part of the elevator control unit.

12. A non-transitory computer-readable medium having stored thereon a computer program comprising instructions executable to cause a safety controller to execute the method according to claim 1.

13. A method for operating an elevator system, the method comprising:
receiving, at a safety controller, a request to drive an elevator car to a destination;
generating, at the safety controller, an elevator car motion profile to serve the received request, the elevator car motion profile including motion parameters of the elevator car, the motion parameters of the elevator car including at least acceleration of the elevator car, a target maximum speed of the elevator car, and deceleration of the elevator car, wherein at least one of the target maximum speed of the elevator car and the deceleration of the elevator car in the generated elevator car motion profile is defined based on the destination; and
monitoring, at the safety controller, a movement of the elevator car in a hoistway based on processing information provided continuously by an absolute positioning system communicatively connected to the safety controller via a safety data bus, the information representing the movement of the elevator car, the information including both of
continuous position information of the elevator car, the continuous position information received from an encoder, and
door zone information receive from a door zone sensor system, the door zone sensor system including a reader device arranged to the elevator car, the door zone sensor system further including a plurality of targets arranged to the hoistway within separate, respective landing zones of a plurality of landings, the door zone information received from the reader device based on the elevator car causing the reader device to pass at least one target of the plurality of targets, wherein if the destination is an extreme destination,
the target maximum speed of the elevator car in the generated elevator car motion profile is a first maximum speed, and/or
a maximum deceleration of the elevator car in the generated elevator car motion profile is a first maximum deceleration,
wherein if the destination is any other destination that the extreme destination,
the target maximum speed of the elevator car in the generated elevator car motion profile is a second maximum speed, first maximum speed being lower than the second maximum speed, and/or
the maximum deceleration of the elevator car in the generated elevator car motion profile is a second maximum deceleration, the first maximum deceleration being lower that the second maximum deceleration,
wherein the elevator system includes a pit safety equipment dimensioned according to the target maximum speed corresponding to the first maximum speed and the maximum deceleration of the elevator car corresponding to the first maximum deceleration, and
wherein the safety data bus extends within a travelling cable that extends along the hoistway to be connected to the plurality of targets and is connected at one end to the elevator car.

* * * * *